United States Patent [19]

Sites et al.

[11] Patent Number: 4,821,169

[45] Date of Patent: Apr. 11, 1989

[54] ACCESS VERIFICATION ARRANGEMENT FOR DIGITAL DATA PROCESSING SYSTEM WHICH HAS DEMAND-PAGED MEMORY WITH PAGE CROSSING DETECTION

[75] Inventors: Richard L. Sites, Boylston; Stanley A. Lackey, Littleton both of Mass.

[73] Assignee: Digital Equipment Corporation, Maynard, Mass.

[21] Appl. No.: 15,576

[22] Filed: Feb. 11, 1987

Related U.S. Application Data

[63] Continuation of Ser. No. 653,511, Sep. 21, 1984, abandoned.

[51] Int. Cl.⁴ ..................... G06F 12/14; G11C 7/00
[52] U.S. Cl. .................................................. 364/200
[58] Field of Search ... 364/200 MS File, 900 MS File

[56] References Cited

U.S. PATENT DOCUMENTS

| | | | |
|---|---|---|---|
| 3,893,084 | 7/1975 | Kotok | 364/200 |
| 3,916,385 | 10/1975 | Parmar | 364/200 |
| 4,016,545 | 4/1977 | Lipovski | 364/900 |
| 4,300,192 | 11/1981 | Couleur et al. | 364/200 |
| 4,386,399 | 5/1983 | Rasala | 364/200 |
| 4,580,214 | 4/1986 | Kubo et al. | 364/200 |
| 4,581,702 | 4/1986 | Saroka | 364/200 |

Primary Examiner—Gary V. Harkcom
Assistant Examiner—Lawrence E. Anderson
Attorney, Agent, or Firm—Nutter, McClennen & Fish

[57] ABSTRACT

A bus interface unit for connecting a processor to a memory to form a digital data processing system. The storage locations in the memory are grouped in pages each having a selected access rights mode which regulates access to the data stored therein by the programs, each of which has a selected access rights mode. The access rights are assigned on a page by page basis. If an access request from a program requires transfers to multiple locations, the processor will normally perform an access verification on the first location while it is in the first transfer operation, and then perform the transfer operation and successive transfer operations. If the transfer operations require accesses to separate pages in memory, a microtrap operation is performed and the processor performs access verifications on locations in both pages before performing any transfers.

15 Claims, 3 Drawing Sheets

INTERFACE
CIRCUIT 15

ACCESS VERIFICATION ARRANGEMENT FOR DIGITAL DATA PROCESSING SYSTEM WHICH HAS DEMAND-PAGED MEMORY WITH PAGE CROSSING DETECTION

This application is a continuation of application Ser. No. 653,511, filed Sept. 21, 1984, now abandoned.

BACKGROUND OF THE INVENTION

1. Field of the Invention

The invention relates generally to the field of digital data processing systems, and more specifically to systems having memory management arrangements incorporating demand-paged virtual addressing in a protection ring environment for regulating access to data as between applications and operating system programs. When a program requires data from two separate pages in memory in a single transfer, the invention enables the processor to determine the right of the program to access the data in both pages before any transfer occurs. If an access does not require data from two pages in the memory, the invention only performs the access check procedure once since all of the data in a page is available to programs having the same access rights.

2. Description of the Prior Art

A digital data processing system generally includes three basic elements; namely, a memory element, one or more input/output elements, and a processor element, all of which are interconnected by one or more buses. The memory element stores data in addressable storage locations. This data includes both operands and instructions for processing the operands. The processor element causes data to be transferred to it, or fetched, from the memory element, interprets the incoming data as either instructions or operands, and processes the operands in accordance with the instructions. The results are then stored in the memory element. Input/output elements also communicate with the memory element in order to transfer data into the system and to obtain the processed data from it. The input/output elements normally operate in accordance with control information supplied by the processor element. The input/output elements may include, for example, printers, teletypewriters, or keyboards and video display terminals, and may also include secondary data storage devices such as disk drives or tape drives.

In most modern data processing systems, the number of addressable storage locations, that is, the address space, that are physically present in the memory element is generally substantially less than the total number of locations which can be addressed. The potential address space in modern computer systems may be anywhere from 64 kilobytes in a system which has address words of 16 address bits, to more than four gigabytes in a system having address words of 32 bits. While modern systems currently can easily include 64 kilobytes of memory, because of space and cost limitations, a four gigabyte memory is impractical. Indeed, in many computer systems, the maximum number of storage locations that are physically present in a memory element is on the order of 10 megabytes.

To allow a programmer to use an address space which may be larger than is physically present in a computer system, virtual address techniques are used. In virtual addressing, both the virtual and the physical address spaces are divided into blocks of contiguous storage locations called "pages", with the pages in virtual address space being the same size, that is, having the same number of locations, as the pages in physical address space. In virtual address systems used by the assignee of the present invention, a page generally represents five hundred and twelve byte storage locations in both virtual and physical memory. The pages which are not being used are stored in the disk or tape drives rather than in the physical memory. Thus, the memory element contains only the pages which are currently being used, and those pages which were most recently used, by the applications program.

When a program requires data in pages which may not be physically present in the memory, the operating system transfers the entire page from the disk containing the page of data into a page in the memory. Since this operation may cause data present in the memory to be overwritten, the operating system may have to transfer the data in the page being overwritten onto the disk. This process, known as "swapping", is essentially transparent to the applications program; that is, since the operation is performed by the operating system rather than the applications program, the applications program need not be aware of either size or configuration of the memory, or the location of the page containing the required data in the disk drive.

After the required page is loaded into memory, the processor must be able to locate the data in the memory for the applications program. The processor performs an address translation from the page containing the virtual address to identify the page in the physical memory. In the virtual address systems used by the assignee, this translation includes the use of a page table entry, which contains the page frame number, that is the identification of the physical page in memory. To shorten the time required for the translation, which can normally take several memory accesses for each translation, processors use translation buffers located in the processor modules themselves which contain a small number of recently used page table entries.

As has been noted, programs processed by a data processing system can be classified as applications programs or operating system programs, which have distinct protection rings to prevent an applications program from modifying instruction code or data for an operating system program, and vice versa. In some systems, the operating system programs may be further divided into several types of programs. For example, in VAX-11 processors using VMS operating systems sold by the assignee of this invention, the operating system programs are divided into kernel, supervisor, and executive programs, each having a separate protection ring. In other operating systems, such as Unix, the various programs forming the operating system are divided similarly.

When a processor attempts to access the contents of a location in memory for a program, whether it be an operating system or an applications program, it first must determine whether the program it is running has the right to access the data. For example, if a processor is running a user program, it normally cannot retrieve data from, or write data to, pages containing data for any of the operating system programs. Typically, all of the data in a page in memory is available to programs having the same access rights. That is, all of the data in each page is available to a user program, or to a program in the kernel, executive, or supervisor, and so data that is accessible by programs in the different protection rings is not loaded into the same page. However, data in different pages is accessible by programs in the different protection rings.

In many modern data processing systems, the smallest addressable unit of data is a byte of eight bits. In systems including the aforementioned VAX-11 processors, up to four bytes of data, that is, one longword, can be requested and retrieved at one time. However, unless the requested longword is such that the address of the least significant byte is longword-aligned, that is, the two least significant bits of the byte's address are zero, two retrievals may have to be performed from contiguous locations in memory to obtain the requested data.

When a processor accesses memory, it thus has to check several things, including whether the page containing the requested data is in memory and whether the requesting program has the right to access the data. In prior processors, if a program requested a memory access which required multiple memory accesses, the processor performed the access check on all of the locations before it made any transfer, since it was desirable to ensure that the request could be completed before any transfers were performed whether or not the accesses were to locations in the same page. However, if the access was to locations in the same page, only one access check would be sufficient to verify that all transfers could take place, since, if the program has access to the first location and the page is in memory, it would be able to perform the other transfers. Thus, it is wasteful to delay the first transfer of a multiple-transfer memory access when all accesses are to the same page and the first access check indicates that the transfer can take place.

SUMMARY OF THE INVENTION

The invention therefore provides an arrangement in which a processor, in response to a request from a program to access a location in memory, tests to determine if the access requires transfers to multiple locations in different pages. If the request requires one transfer or multiple transfers to locations in the same page, the processor performs an access verification check on the first location to verify that the page is in memory and the program has the right to access the location, and performs the transfers if the check verifies that the program can access the page. If the request requires transfers to more than one page, the processor traps to perform an access verification check on locations in both pages before performing any transfers.

BRIEF DESCRIPTION OF THE DRAWINGS

This invention is pointed out with particularity in the appended claims. The above and further objects and advantages of this invention may be better understood by referring to the following description taken in conjunction with the accompanying drawings, in which:

DESCRIPTION OF AN ILLUSTRATIVE EMBODIMENT

Figure 1:
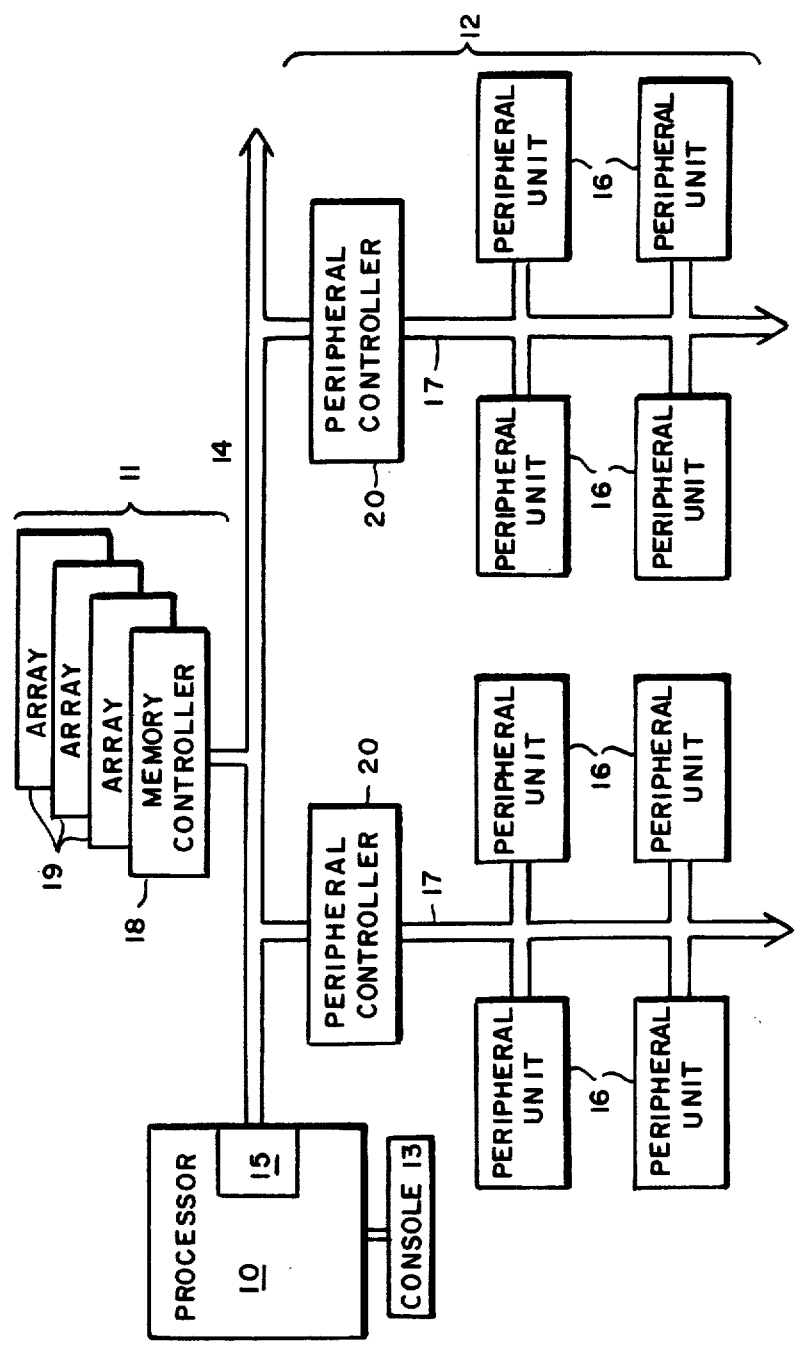
FIG. 1 is a block diagram of a digital data processing system constructed in accordance with this invention.

As exemplified in FIG. 1, the basic elements of a digital data processing system including the invention comprise a central processor unit (processor) 10, a memory 11, including a memory controller 18 and memory arrays 19, and input/output units generally indicated by reference numeral 12. The processor 10 executes instructions that are stored in addressable storage locations in the arrays 19 of memory 11. The instructions identify operations that are to be performed on operands, which are also stored in addressable locations in the memory. The instructions and operands are fetched by the processor 10 as they are needed, and the processed data are returned to the memory for storage therein.

The processor 10 also transmits control information to the input/output units, enabling them to perform selected operations, such as transmitting data to or retrieving data from the memory 11. Such data may be instructions or operands which may be transmitted to the memory, or processed data which is retrieved from the memory unit for storage or display.

An operator's console 13 connected to processor 10 serves as the operator's interface. It allows the operator to examine and deposit data, halt the operation of the processor unit 10, or step the processor through a sequence of instructions that determine the operations performed by the processor in response thereto. It also enables an operator to initialize the system through a bootstrap procedure, and perform various diagnostic tests on the entire data processing system.

Processor 10 communicates with the memory 11 and input/output units 12 through an interface 15 and over an input/output bus 14. Bus 14 may, for example, be similar to the buses described in U.S. Pat. No. 4,232,366, issued Nov. 4, 1980, to John V. Levy, et al., or U.S. patent application Ser. No. 534,829, filed Sept. 22, 1983, both of which are assigned to the assignee of the present invention. In response to requests from the program, the processing circuits within processor 10 enable the bus interface 15 to retrieve data and control information from or transmit them to the memory 11 and input/output units 12 connected to the bus 14.

The data processing system may include several types of input/output units 12. These units, generally identified as peripheral units 16, include disk and tape secondary storage elements, teletypewriters, keyboards and video display terminals and the like. Peripheral units 16 are connected through respective buses 17 to controllers 20, which translate between protocols on bus 14 and buses 17 and control the operations of the peripheral units 16. Buses 17 may, for example, be similar to the buses described in U.S. Pat. No. 3,815,099 issued June 4, 1974, in the name of John Cohen, et al., and U.S. Pat. No. 3,999,163 issued in the name of John V. Levy et al. Both of these patents are assigned to the assignee of the present invention.

In the system depicted in FIG. 1, the address space, that is, the number of storage locations, available to a programmer generally corresponds to the number of locations identified by the contents of a single register in processor 10. For example, in the assignee's VAX-11 series of processors, the internal registers are 32 bits in width, and the address space, that is, the number of addressable locations available to a programmer, is on the order of four gigabytes. However, the number of physical locations actually present in the system is considerably less, typically on the order of ten megabytes in the memory 11. Several more locations are also used for control and status registers in the input/output units 12.

Figure 2:
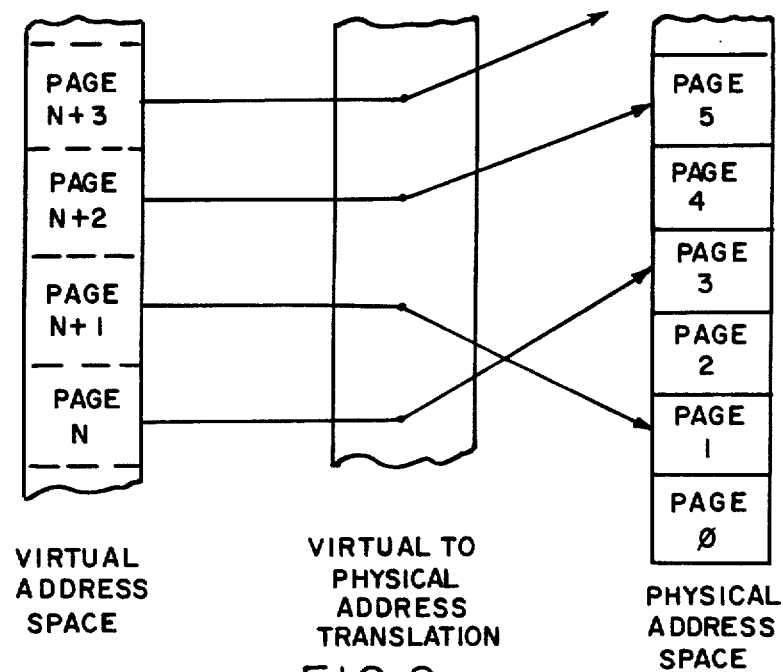
FIG. 2 is a diagram illustrating the relationship between the virtual address space and the physical address space in the data processing system depicted in FIG. 1.

To make the entire address space available to the programmer, the data processing system of FIG. 1 uses a virtual memory management arrangement in which the programmer's virtual addresses are mapped into locations in the physical locations contained in memory 11. With reference to FIG. 2, both the virtual address space and the physical address space are divided into pages, that is, blocks of a predetermined number of addressable locations. In the aforementioned VAX-11 systems, five hundred and twelve locations form a page in both the virtual and physical address spaces. The nine low-order bits of an address identify each location in the page, essentially operating as an offset into the page to the addressed location. The remaining address bits identify the page.

With reference to FIG. 2, the processor 10, and specifically interface 15, includes a virtual to physical address translation arrangement which receives a virtual address from the processing circuits in processor 10 and translates them into physical addresses for transfer over bus 14 to memory 11. FIG. 2 illustrates this operation diagrammatically. As illustrated in FIG. 2, the addresses of the locations in page (N) in the virtual address space of the program are translated into addresses in, for example, page (3) of the physical address space. That is, the data in virtual address page (N) are actually located in page (3) of physical memory space, that is, in memory 11. Similarly, locations in page (N+1) of the virtual address space are physically located in page (1) of the physical address space in memory 11, and the addresses in page (N+2) of the virtual address space are in page (5) in the physical address space. The contents of pages (0), (2) and (4) of the physical address space may currently be allocated to other programs or to other pages (which are not shown) in the virtual address space of this program. The locations in page (N+3) of the virtual address space are not in the physical memory, as shown by the arrow not pointing to any location in the physical address space. The virtual to physical address translation mechanism, when it receives an address in page (N+3), enables the processor 10 to transfer or to enable the requested page to be transferred from the disk to the memory.

Figure 4:
FIG. 4 is a diagram of a page table entry that is useful in understanding the operation of the bus interface circuit depicted in FIG. 3.

The data processing system depicted in FIG. 1 processes applications programs and operating system programs. The operating system programs are divided into three sets of programs, namely, kernel, executive and supervisor programs. Each of these programs, plus the applications programs, can access certain data. For example, it may be undesirable to allow an applications program to read data from or write data into certain locations reserved for operating system programs. The virtual to physical address translation mechanism described above with respect to FIG. 2 generates a page table entry as depicted in FIG. 4. The page table entry includes a page frame number PFN which corresponds to the high order bits of the physical address, specifically identifying the physical page associated with the page table entry. The page table entry also includes a valid bit V and modify bit M, which are not relevant to this invention, and a protection field PROT which identifies the access rights of the various programs to the data in that page. The PROT protection field indicates the protection levels whose programs can access locations in the requested page.

In the system depicted in FIG. 1, the programs processed by processor 10 may request data from multiple contiguous storage locations in memory 11 at one time. For example, in the computer system described in the above-referenced Levy et al. U.S. Pat. No. 4,232,366, programs executed by the processor 10 can request access to either one byte of data, a word (2 bytes) of data, a longword (4 bytes) a quadword (eight bytes) or sixteen bytes of data at one time. The input/output bus of that system transfers at most four bytes of data at once. When the program requests access to four bytes or less and unless the data is longword-aligned, the interface circuitry 15 have to perform two transfers over bus 14 to transfer all of the data required by the processing circuits in processor 10. If eight or sixteen bytes are accessed, at least two bus transfers on a four-byte access, or four bus transfers on a sixteen byte access, are required. In most cases, those transfers will be with locations within the same page. However, in some instances the multiple transfers will require crossing a page boundary.

Figure 3:
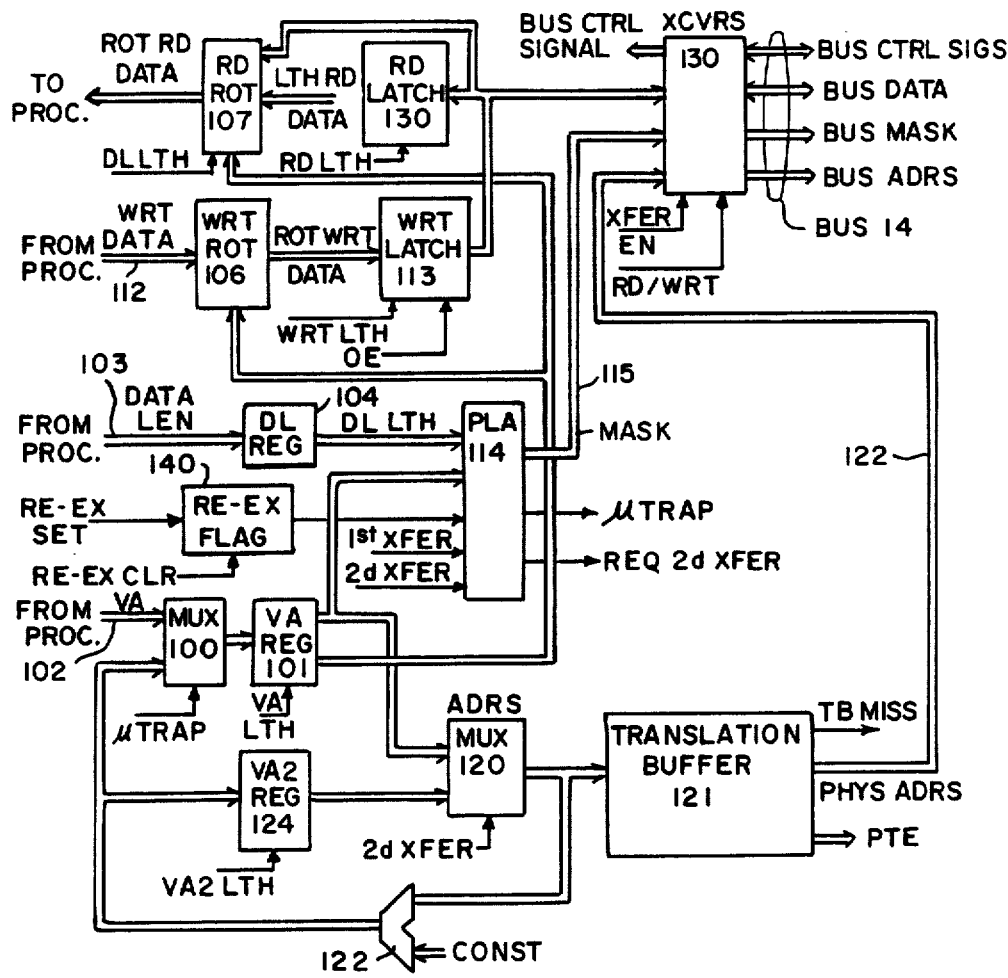
FIG. 3 is a block diagram of a bus interface circuit useful in the processor depicted in FIG. 1.
Figure 3:
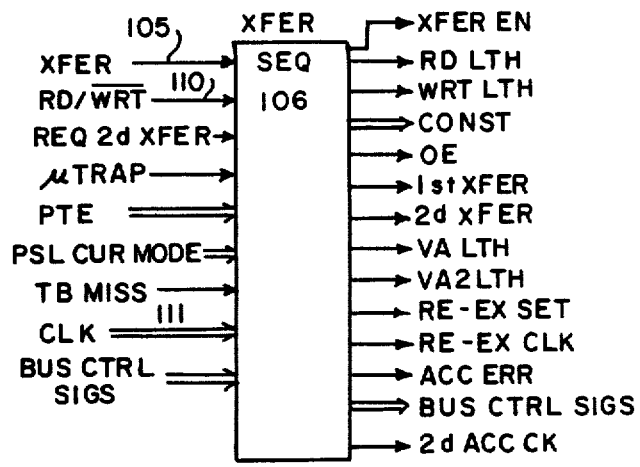

FIG. 3 contains a block diagram of an interface circuit 15 (FIG. 1) constructed in accordance with this invention. When the processing circuits in processor 10 initiate a transfer over bus 14, they transfer a virtual address through a multiplexer 100 and into virtual address register 101 over lines 102. Processing circuits also transmit a DATA LEN data length signal over lines 103, which are latched in a data length register 104, and an XFER transfer signal over line 105 to a transfer sequencer 106. The XFER transfer signal enables the transfer sequencer 106 to, in turn, enable the interface 15 to perform a bus transfer sequence as described below.

The processing circuits also transfer an RD/WRT read/write signal on line 110 to transfer sequencer 106 to indicate whether the transfer operation is a read transfer or a write transfer. In addition, processing circuits in processor 10 provide the necessary CLK clock timing signals on lines 111 to synchronize transfer sequencer 106 with other circuits in processor 10.

If the transfer is a write operation, the processing circuits in processor 10 also provide write data on write data lines 112 which are connected to the input terminals of a write rotater 106. If the transfer is of more than four bytes, the data is provided in four-byte groups by the processing circuits as they are transferred by the interface circuit 15. The write data signals are bytewise rotated in response to the two low order bits of the virtual address stored in the virtual address register 101, and transmitted as ROT WRT DATA rotated write data signals, which are then latched in a write latch 113 in response to a WRT LTH write latch signal from transfer sequencer 106.

Figure 3A:
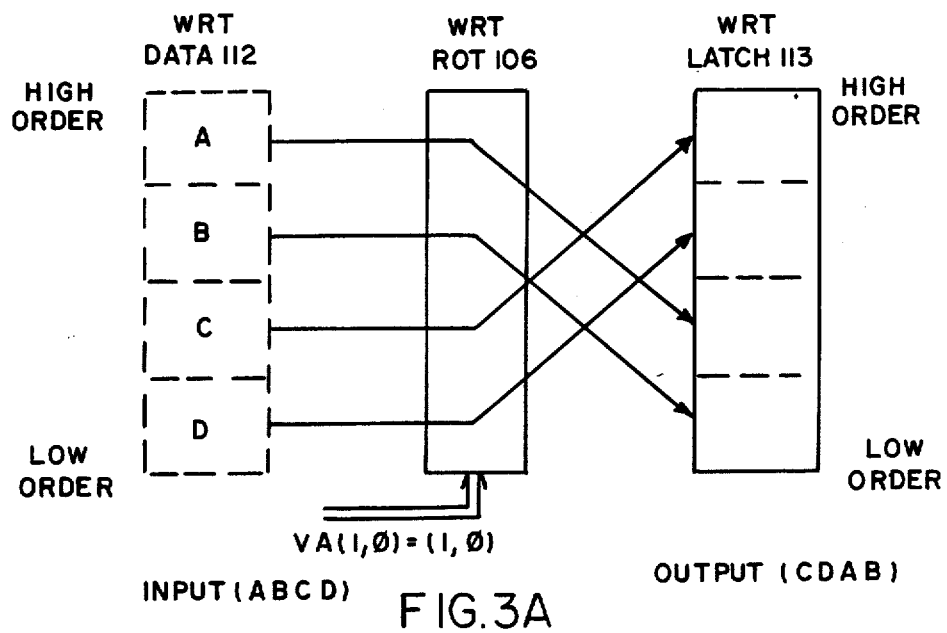
FIG. 3A is a diagram illustrating the operation of a portion of the bus interface circuit depicted in FIG. 3.

FIG. 3A illustrates the operation of the write data rotation as performed by write rotater 106 when the write data lines 112 have a four byte width and the low order bits of the virtual address register have the value (1,0). In that case, the two high order bytes are transferred to and stored in the two low order byte locations in write latch 113. Data bytes from the low order lines of write data lines 112 are transferred to and stored in the high order byte locations in byte latch 113. The interface 15 (FIG. 1) then performs one transfer, if one or two bytes are to be transferred to the memory 11, or two transfers if more than two bytes are to be transferred. The data in the two high order byte locations are transferred during the first transfer, and data in the low order byte locations of write latch 113 are transferred during the second transfer. The byte locations for which data is transferred during each transfer are identified by MASK signals generated by a PLA (programmable logic array) 114 in response to the data length stored in the data length register 104 and the two low order bits in virtual address register 101.

In response to the contents of the data length register 104 and the two low-order bits of the contents of virtual address register 101, the PLA 114 also generates a REQ 2D XFER request second transfer signal if more than one bus transfer is required for the memory access. This signal remains asserted until all of the data requested has been transferred.

In addition, the PLA 114, in response to the nine low-order bits of the contents of virtual address register 101, the contents of data length register 104 and if a re-examination flag 140 is not set, PLA 114 asserts a uTRAP microtrap signal. The transfer operation is halted temporarily, and the interface circuit performs a microtrap operation. If the re-examination flag 140 is set, the uTRAP signal is not asserted, and the transfers are performed.

It will be appreciated that the MASK signals generated by PLA 114 will differ as between the various transfers, the particular MASK signals generated also depends upon a 1ST XFER first transfer signal and 2D XFER second transfer signals generated by transfer sequencer 106 to indicate which transfer is currently taking place. In one specific embodiment, if a request requires the transfer of more than four bytes, the transfers must be longword-aligned, and so all of the mask signals will be asserted for those transfers. In those cases, the mask signals will be the same in each transfer.

During a first transfer over bus 14, the transfer sequencer 106 negates the 2D XFER second transfer signal, which enables the contents of the virtual address register 101 to be coupled through address multiplexer 120 to a translation buffer 121. The translation buffer translates the virtual address received from virtual address register 101 into a physical address in a known manner. The physical address signals from translation buffer 121 are transmitted on lines 122.

U.S. Pat. No. 4,319,323 issued to T. Ermolovich et al., and assigned to the assignee of the present invention, describes the translation algorithm used by one specific embodiment of this invention. The translation algorithm makes use of a page by page mapping from the virtual address space to the physical address space (see FIG. 2). The high order bits of the virtual address identify the virtual address page containing the desired data, and specifically identify the page table entry (see FIG. 4) whose page frame number corresponds to the high order bits of the physical address in the physical address space which contains the desired data. The low order bits of the virtual address are concatenated onto the page frame number as the low order bits of the physical address.

Translation buffer 121 stores a number of page table entries for recently used pages in memory 11. If the translation buffer does not have a page table entry for the page identified by the high order bits of the virtual address that it receives from virtual address register 101, it transmits a TB MISS translation buffer miss signal to transfer sequencer 106. The transfer sequencer then interrupts the processing circuits in processor 10 to enable the processor to either obtain the page table entry as described in the aforementioned Ermolovich et al. patent, or to remap the translation buffer to provide the necessary page table entry. Both of these operations are performed in a conventional manner.

The translation buffer 121, contemporaneously with the address translation, also transmits the page table entry, and specifically the PROT protection field thereof, to transfer sequencer 106. The transfer sequencer then performs an access verification check operation to determine whether the requesting program can access the requested location. The protection level of the requesting program is indicated by a CUR MODE current operating mode field which is present in the processor status longword, which is coupled to transfer sequencer 106. If the CUR MODE and PROT signals do not compare favorably, the transfer sequencer stops the transfer operation and generates an ACC ERR access error signal.

If further transfers over bus 14 are required to transfer all the data requested by the program, the virtual address signals from virtual address register 101 are coupled to one input of an adder 122. The constant value is selected to enable the sum to identify the next longword location in memory 11. The sum is transmitted to and stored in a VA2 register 124 in response to a VA2 LTH latch signal from transfer sequencer 106. During each succeeding transfer, the contents of the VA2 register are coupled through address multiplexer 120, under control of the 2D XFER signal, to the input of terminals of translation buffer 121. The translation operation occurs in the same manner as the first transfer and, if additional transfers are required, the address is incremented and stored in the VA2 register.

The translation buffer, in one specific embodiment, also checks the translation buffer mapping and transmits the PROT field of the page table entry for the access verification check by the transfer sequencer, during the succeeding transfers. These operations are not, however, necessary, as the operations during the first transfer are sufficient to verify that the later transfers can proceed, but a flag would typically be required to inhibit the operations during succeeding transfers.

During each transfer, the physical address from lines 122 and the MASK signals from lines 115 are transmitted to a set of bus transceivers 130. If the operation is a write operation, data signals from write latch 113 are coupled to data input terminals of transceiver 130, and the transceivers are conditioned, by the RD/WRT read/write signal, to couple the data onto the data bus lines. The XFER EN transfer enable signal from transfer sequencer 106 enables the transceivers to couple the data, mask, and physical address signals onto the respective lines of bus 14 at the correct times. In addition, the XFER EN transfer enable signal enables the transceiver to couple the bus control signals from transfer sequencer 106 onto respective lines of the bus, and to receive bus control signals from respective lines of the bus and couple them to the transfer sequencer 106. The particular timing with which the various signals are coupled onto the bus 14 is determined by the particular protocol used on the particular bus. The signaling protocol is not relevant to the invention and will not be discussed further.

If the transfer operation is a read operation, the transceiver 130 are conditioned to receive read data from the bus data lines and store them in a latch 131 in response to a RD LTH read latch signal from transfer sequencer 106. If multiple transfers are required over bus 14 to retrieve all the data requested by the program, the data from the first transfer are stored in latch 131. The data from the second transfer are coupled directly to a read rotator, which also receives the data from the read latch. The read rotater 107, under control of the two low-order bits of the virtual address stored in VA register 101 and the contents of the data length register 104, then rotates the data in a similar manner as the write rotator 106 described earlier in connection with FIG. 3A.

As has been noted, the PLA 114 generates a uTRAP microtrap signal if a re-examination flag 140 is not set. If the uTRAP microtrap signal is asserted, the transfer sequencer, before enabling any transfers over bus 14, checks to ensure that both pages are in memory and that the requesting program has the right to access the locations in both pages. This is done before any bus transfers take place.

In the microtrap operation, the virtual address in the virtual address register 101 is coupled through address multiplexer 120 to the translation buffer 121. The translation buffer ensures that the page is in memory, and also transmits the page table entry, and in particular the PROT protection field thereof, to transfer sequencer 106. The contents of the virtual address are incremented by a constant value of sixteen by an adder 122, the constant being provided by transfer sequencer 106. The sum is returned to the virtual address register 101 through a multiplexer 100 conditioned in response to the asserted uTRAP signal. The constant is selected so as to ensure that the access verification is made with respect to a location in the second page, even if the memory access if for sixteen bytes. The sum is returned to the virtual address register 101.

If the PROT protection field of the page table entry and the CUR MODE current mode field of the processor status longword indicate that the program can access the page, an access check is again performed in connection with the contents of the virtual address register. In this access check operation, the virtual address register contains an address in the next page in memory, that is, the page which contains the location for the second transfer. The address multiplexer 120 couples the contents of the virtual address register 101 to the translation buffer to verify that the page is in memory and to obtain the page table entry for that location. The transfer sequencer 106 then transmits CONST signals having a value of negative sixteen to adder 122. The sum is stored in the virtual address register 101, thereby returning the contents to the virtual address at the beginning of the microtrap operation.

If the second access check operation determines that the PROT protection field of the page table entry and the CUR MODE current mode field from the processor status longword, indicate that the program can also access that page the transfer sequencer 106 transmits an RE-EX SET re-examination flag set signal which sets re-examination flag 140. The transfer sequencer 106 is also reset to the beginning of the transfer sequence.

The transfer sequencer 106 then begins the transfer operation from the beginning. Since the re-examination flag 140 is set, PLA 114 does not generate the uTRAP microtrap signal. When the microtrap signal is negated, the transfer sequencer does not perform the microtrap operation, but instead proceeds to perform the required transfers over bus 14. At the end of the transfer operation, the transfer sequencer 106 transmits an RE-EX CLR re-examination flag clear signal, which resets re-examination flag 140.

A benefit of the invention is that, unlike prior processors which first check to determine whether all transfers of a multiple transfer memory access can be performed before any transfers are performed, the new processor usually performs one check operation for the first transfer, contemporaneous with the virtual to physical address translation, and then performs all of the transfers. Only if the transfer operations are to separate pages does the processor perform separate access checks before any transfers, and then only on locations in the two pages. Since the transfers in which locations are in the same page are far more numerous than transfers in which locations are in different pages, transfers can be performed more rapidly than in prior processors.

The foregoing description has been limited to a specific embodiment of this invention. It will be apparent, however, that the invention can be practiced in data processing systems having diverse basic construction, or in systems that use different internal circuitry than is disclosed in this specification with the attainment of some or all of the advantages of the invention. Therefore, it is the object of the appended claims to cover all such variations and modifications as come within the true spirit and scope of the invention.

What is claimed as new and desired to be secured by Letters Patent of the United States is:

1. In a processor, a bus interface unit for connection to a memory over a bus to form a digital data processing system, said processor including processing means for processing programs each having a selected one of a plurality of access rights modes, said memory including a plurality of addressable storage locations each including a like plurality of individually accessible byte locations, the storage locations being group into a plurality of pages each having a selected number of storage locations, with each page having an access right mode, said bus interface unit including:
  a. transfer means for connection to said processing means and said bus and responsive to a single transfer request from said processing means for initiating a memory access over said bus to two adjacent addressable locations in said memory in two transfers over said bus;
  b. access verification means connected to said transfer means and responsive to said transfer means initiating a memory access for enabling said transfer means to perform an access verification operation to determine whether the access right mode of said program corresponds to the access right mode of one of the addressable locations; and
  c. trap means including:
  i. page test means connected to said transfer means and responsive to said transfer means initiating a memory access to two adjacent locations in memory for determining whether the transfers are to separate pages;
  ii. page cross verification enabling means connected to said page test means and said access verification means for enabling said access verification means to perform two access verification operations in response to said page test means determining that the transfers are to separate pages, each access verification operation being directed to one of the addressable locations in each of the pages, to determine whether the access mode right of said program corresponds to the access right modes of both of the addressable locations; and iii. page cross transfer enabling means connected to said page test means, said access verification means and said transfer means for disabling said transfer means in response to said page test means determining that the transfers are to separate pages and to thereafter enable said transfer means to engage in the transfers in response to the determination by said access verification means that the access right mode of the program corresponds to the access right modes of both addressable locations whereby regardless of the number of transfer which have to be made to any two pages in response to one transfer request only two access verifications need be made.

2. A bus interface unit as defined in claim 1 wherein said processing means generates addresses, said transfer means including:

A. address storage means for connection to said processing means for receiving and storing an address from the processing means generated by the program being process by said processing means;

B. data length storage means for connection to said processing means for receiving and storing data length information from said processing means identifying the number of adjacent storage sublocations in said memory with respect to which the transfer is to occur;

C. transfer number identification means connected to said address storage means and responsive to the address stored in said address storage means and said data length storage means for determining the number of transfers over the bus required to perform the data transfer requested by the program.

3. A bus interface unit as defined in claim 2 further comprising a re-examination flag connected to said trap means and said transfer means and set in response to the beginning of operation of said trap means and reset in response to the transfer means performing the transfer requested by the program, said trap means being inhibited from beginning a new operation in response to the set re-examination flag.

4. A bus interface unit as defined in claim 2, further including:

A. address increment means connected to said address storage means and said data length storage means for generating an incremented address identifying the next addressable storage location if the contents of the data length storage means indicates that more than one transfer are required to transfer all of the requested sub-locations; and B. incremented address storage means connected to said address increment means and said transfer means for storing the incremented address;

said transfer means including selection means connected to said address storage means and said incremented address storage means for iteratively selecting the contents of one of said address storage means and said incremented address storage means and transmission means connected to said selection means for transmitting the selected contents over said bus during a transfer.

5. A bus interface unit as defined in claim 4 in which said addresses from said processing means constitute virtual addresses, said selection means further including multiplexer means to select the contents of one of said address storage means or said incremented address storage means and virtual address translation means connected to said multiplexer means and for translating the virtual addresses from said multiplexer means into physical addresses.

6. A bus interface unit as defined in claim 2 wherein said processing means generates data for transmission through said bus interface unit and receives data from said bus interface unit, said bus interface unit further comprising data means comprising:

A. data transmission means comprising i. transmit data rotator means for connection to said processing means and connected to said address storage means for rotating the data received from said processing means in relation to the contents of said address storage means and ii. transmit data latch means connected to said transmit data rotator means and for connection to said bus for latching the rotated data from said transmit data rotator means for transmission over said bus; and B. data receiving means comprising:

i. receive data latch means for connection to said bus for latching data from said bus; and ii. receive data rotator means for connection to said processing means and connected to said receive data latch means and said address storage means for rotating the data received from said receive data latch means in relation to the contents of said address storage means and transmitting the rotated data to said processing means.

7. A bus interface unit as defined in claim 6 wherein said data transmission means further includes mask signal generating means connected to said address signal storage means and for connection to said bus for generating mask signals for transmission over said bus contemporaneous with the transmission of data signals from said transmit data latch means to identify the sub-locations in which data signals are to be written.

8. A bus interface unit as defined in claim 6 wherein said receive data rotator means is further for connection to said bus, said data receiving means further including receive control means for enabling said receive data latch means to latch data from said bus during a first transfer and said receive data rotator means to perform the rotation of the data stored in the receive data latch means and the data from said bus during a second transfer.

9. In a processor, a bus interface unit for connection to a memory over a bus to form a digital data processing system, the memory including a plurality of addressable storage locations each having a plurality of adjacent individually addressable sub-locations, the locations in said memory being grouped into a plurality of pages each having a predetermined number of storage locations, the bus including address transfer lines, control signal transfer lines and data transfer lines for transferring data for alocation, the processor including processing means for processing programs that request transfers of data with a plurality of adjacent sub-locations, the bus interface unit comprising:

a. mode means for storing a protection level mode for the program being processed by said processing means;

b. address storage means for connection to said processing means for receiving and storing an address from the processing means generated by the program being processed by said processing means;

c. data length storage means for connection to said processing means for receiving and storing data length information from said processing means identifying the number of adjacent storage sublocations in said memory with respect to which the transfer is to occur;

d. transfer number identification means connected to said address storage means and said data length storage means for determining the number of transfer over the bus required to perform the data transfer requested by the program in response to the address stored in said address storage means and said data length storage means;

e. access verification means connected to said mode means for determining if the program can access the location identified by the address in said address storage means in response to the contents of said mode means;

f. transfer means for connection to said bus and connected to said address storage means, said transfer number identification means and said access verification means for performing a transfer requested by a program over said bus using the address stored in said address storage means when said access verification means determines that the program can access the location identified by the address in said storage means;

g. page crossing detection means connected to said address storage means and said data length storage means and responsive to the address and data length information stored therein to determine whether a transfer requested by a program requires transfers to the memory in two different pages; and h. trap means connected to said page crossing detection means, said access verification means, and said transfer means and responsive to said page crossing means detecting that a transfer requested by a program required transfer to the memory in two different pages for enabling said access verification means to determine if the program can access one location in each of the two pages and for inhibiting said transfer means from performing a requested transfer until said access verification means has determined that the program can access a location in each of the two pages whereby regardless of the number of transfer which have to be made to any two pages in response to one transfer request only two access verifications need be made.

10. A bus interface unit as defined in claim 9 wherein said bus interface unit further comprises a re-examination flag connected to said trap means and said transfer means and set in response to the beginning of operation of said trap means and reset in response to the transfer means performing the transfer requested by the program, said trap means being inhibited from beginning a new operation in response to the set re-examination flag.

11. A bus interface unit as defined in claim 9 further including:

A. address increment means connected to said address storage means and said data length storage means for generating an incremented address identifying the next addressable storage location if the contents of the data length storage means indicates that more than one transfer are required to transfer all of the requested sub-locations; and B. incremented address storage means connected to said address increment means and said transfer means for storing the incremented address;

said transfer means including selection means connected to said address storage means and said incremented address storage means for iteratively selecting the contents of one of said address storage means and said incremented address storage means and transmission means connected to said selection means for transmitting the selected contents over said bus during a transfer.

12. A bus interface unit as defined in claim 11 in which said address from said processing means constitute virtual addresses, said selection means further including multiplexer means to select the contents of one of said address storage means or said incremented address storage means and virtual address translation means connected to said multiplexer means and for translating the virtual addresses from said multiplexer means into physical addresses.

13. A bus interface unit as defined in claim 9 wherein said processing means generates data for transmission through said bus interface unit and receives data from said bus interface unit, said bus interface unit further comprising data means comprising:

A. data transmission means comprising
i. transmit data rotator means for connection to said processing means and connected to said address storage means for rotating the data received from said processing means in relation to the contents of said address storage means and
ii. transmit data latch means connected to said transmit data rotatable means and for connection to said bus for latching the rotated data from said transmit data rotator means for transmission over said bus; and B. data receiving means comprising:
i. receive data latch means for connection to said bus for latching data from said bus; and
ii. receive data rotator means for connection to said processing means and connected to said receive data latch means and said address storage means for rotating the data received from said receive data latch means in relation to the contents of said address storage means and transmitting the rotated data to said processing means.

14. A bus interface unit as defined in claim 13 wherein said data transmission means further includes mask signal generating means connected to said address signal storage means and for connection to said bus for generating mask signals for transmission over said bus contemporaneous with the transmission of data signals from said transmit data latch means to identify the sub-locations in which data signals are to be written.

15. A bus interface unit as defined in claim 13 wherein said receive data rotator means is further for connection to said bus, said data receiving means further including receive control means for enabling said receive data latch means to latch data from said bus during a first transfer and said receive data rotator means to perform the rotation of the data stored in the receive data latch means and the data from said bus during a second transfer.

* * * * *